United States Patent
Hoffman

(10) Patent No.: US 10,999,632 B2
(45) Date of Patent: May 4, 2021

(54) CHURN ANALYSIS AND METHODS OF INTERVENTION

(71) Applicant: Rovi Guides, Inc., San Jose, CA (US)

(72) Inventor: Michael Hoffman, Durham, NC (US)

(73) Assignee: Rovi Guides, Inc., San Jose, CA (US)

( * ) Notice: Subject to any disclaimer, the term of this patent is extended or adjusted under 35 U.S.C. 154(b) by 36 days.

(21) Appl. No.: 16/400,371

(22) Filed: May 1, 2019

(65) Prior Publication Data

US 2020/0267449 A1  Aug. 20, 2020

Related U.S. Application Data

(60) Provisional application No. 62/806,251, filed on Feb. 15, 2019.

(51) Int. Cl.
| | | |
|---|---|---|
| H04N 21/466 | (2011.01) | |
| H04N 21/442 | (2011.01) | |
| H04N 21/458 | (2011.01) | |

(52) U.S. Cl.
CPC ... *H04N 21/4662* (2013.01); *H04N 21/44204* (2013.01); *H04N 21/458* (2013.01)

(58) Field of Classification Search
CPC ............ H04N 21/4662; H04N 21/458; H04N 21/44204; H04N 21/251; H04N 21/258; H04N 21/466; H04N 21/2543
See application file for complete search history.

(56) References Cited

U.S. PATENT DOCUMENTS

| | | | |
|---|---|---|---|
| 7,761,892 B2 | 7/2010 | Ellis et al. | |
| 8,744,898 B1 * | 6/2014 | Hewett | G06Q 30/02 705/7.31 |
| 9,525,899 B2 | 12/2016 | Hoctor et al. | |
| 2015/0312604 A1 * | 10/2015 | Hoctor | H04N 21/2668 725/14 |
| 2016/0253688 A1 | 9/2016 | Nielsen et al. | |
| 2017/0004513 A1 | 1/2017 | Vadakattu et al. | |

OTHER PUBLICATIONS

International Search Report and Written Opinion of PCT/US2020/018429 dated Jun. 22, 2020.

* cited by examiner

*Primary Examiner* — Benjamin R Bruckart
*Assistant Examiner* — Tien M Nguyen
(74) *Attorney, Agent, or Firm* — Haley Guiliano LLP

(57) ABSTRACT

Systems and associated methods are described for providing content recommendations. The system accesses content item consumption data for a plurality of users subscribed to a media service. Then, the system determines that a first subset of the plurality of users has unsubscribed from the media service and that a second subset of the plurality of users has not unsubscribed from the media service. The system identifies a time slot typical for the first subset of users and atypical for the second subset of users based on content item consumption data of the first subset of users and content item consumption data of the second subset of users. In response to determining that a user is consuming a first content item at the identified time slot, the system generates for display a recommendation for a second content item that is scheduled for a different time slot.

20 Claims, 8 Drawing Sheets

CHURN ANALYSIS AND METHODS OF INTERVENTION

CROSS-REFERENCE TO RELATED APPLICATION

This application claims benefit of U.S. Provisional Application No. 62/806,251, filed Feb. 15, 2019 which is hereby incorporated by reference herein in its entirety.

BACKGROUND

The present disclosure relates to systems and methods for providing media content recommendations, and more particularly to systems and related methods for providing media content recommendations designed to decrease the risk of user churn.

SUMMARY

Modern media distribution systems often provide media content item recommendations to users. In one approach, media content item recommendations are provided based on analysis of what content the user already prefers. For example, a user who enjoys sports programming will typically receive sports programming recommendations. Often, the users who watch only a limited selection of content are at a heightened risk of churn (e.g., unsubscribing from their current media service). In these cases, recommendations for the same type of content that the user already watched do not serve to expose that user to other types of content and thus fail to lower the risk of churn.

To address these shortcomings, systems and methods are described herein that provide content recommendations that expose a user to new types of content and thus prevent user churn (as shown by empirical analysis of behavior of large amount of users). To this end, a content recommendation application accesses content item consumption data for a plurality of users subscribed to a media service. For example, the content recommendation application may access a database of all content items requested by all users over a certain period of time. The content recommendation application then divides the users into a first subset that have canceled the subscription and into a second subset that have maintained the subscription.

The information about the subsets of users is analyzed to identify features of the users and/or features of content consumed by the users. For example, the content recommendation application may identify time slots at which users of the first subset (users who have churned) typically consume content items and time slots at which users of the second subset (users who did not churn) typically consume content items. The content recommendation application may also identify content types (e.g., genre, length, rating) typical of users of the first subset (users who have churned), and content types (e.g., genre, length, rating) typical of users of the second subset (users who have not churned).

The content recommendation application may then monitor users for content consumption behavior which is typical of users in the first subset and is thus likely to churn. For example, the content recommendation application may identify a user that is consuming content of the type that is typical of the first subset at time slots that are also typical of the first subset. To alleviate the risk of churn and to provide the user with new types of content, the content recommendation application may then generate for display for the identified user a recommendation for content that is typically consumed by users of the second subset (users who did not churn). For example, the user may be provided with a recommendation to watch a new type of content at a new time slot that is typical of the second subset of users. As a result, the user is exposed to new types of content at new time slots and as data shows, becomes less likely to churn. For example, the content recommendation application may generate a recommendation for an EPG (electronic programming guide) of a cable system (e.g., Cox™ or Verizon™), or as part of an OTT (over-the-top) media streaming application (e.g., Netflix™ or Amazon™).

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
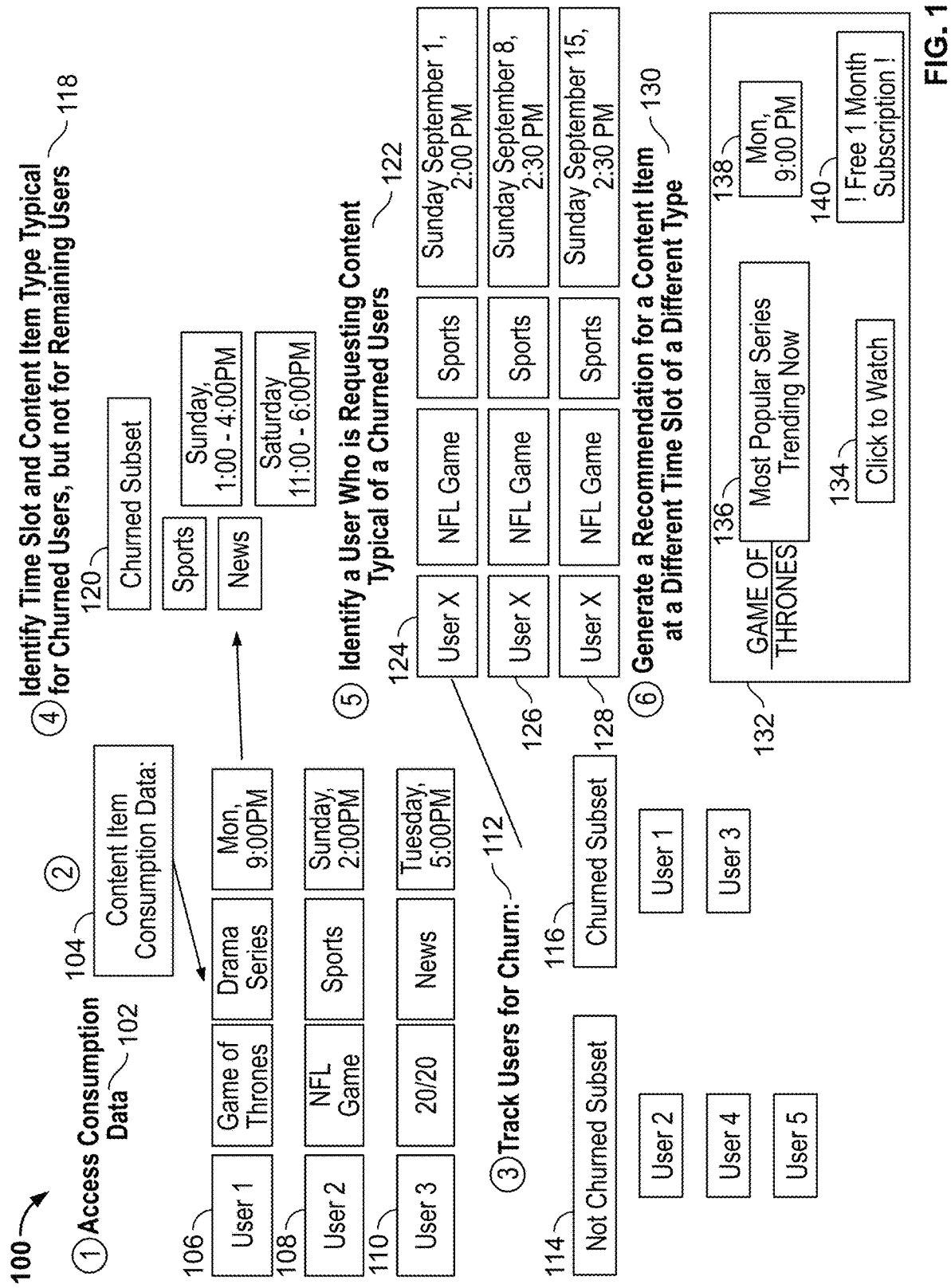
FIG. 1 depicts an illustrative scenario for a content recommendation application providing media content recommendations, in accordance with some embodiments of the disclosure.

FIG. 1 depicts an illustrative scenario for a media content recommendation application that provides media content recommendations. Media content or content may refer to any kind of video, audio, text, or multimedia content, or any combination thereof. For example, a media content item may be a TV show, a movie, a song, a podcast, a video game, any other type of media content item or any combination thereof.

At step 102, the content recommendation application may access consumption data about users that are subscribers to a media service (e.g., a cable media service or OTT media service). The content recommendation application may access consumption data of all users of a service. For example, the content recommendation application may access records maintained by a cable company or by an OTT provider. In some embodiments, the data may be in table form 104 as shown in FIG. 1. However, the data may also be accessed as a database or as any other data structure. For example, the content recommendation application may access records 106, 108, and 110, which describe the history of user consumption data. Record 106 may indicate that user 1 has consumed a drama series show, "Game of Thrones", on Monday at 9:00 PM. Record 108 may indicate that user 1 has consumed sports programming, "NFL Game", on Sunday at 2:00 PM. Record 110 may indicate that user 1 has consumed news programming, "20/20", on Tuesday at 5:00 PM. In some embodiments, the data may be accessed for any number of users (e.g., all users subscribed to the service, all users in a particular area, or all users in a certain demographic) for any time period (e.g., one week or one month). In addition, the data may include additional data about the users (e.g., profile information, demographic information, etc.)

At 112, the content recommendation application tracks or determines user churn. For example, the content recommendation application may query the user database of the media service provider to check which users (e.g., users from entries 106, 108, 110) have unsubscribed (churned) from the media service. For example, the first subset 114 may include user 2, user 4, and user 5 who have unsubscribed from the media service, while second set 116 may include user 1, and user 3 who have not unsubscribed from the media service.

At 118, the content recommendation application may analyze the data of users in subset 114 and 116 (e.g., by using a partial least squares Partial Least Squares (PLS) regression model or a Shapley additive model) to identify features of the users that are predictive of churn (e.g., by comparing features of users who churned to features of users who did not churn). For example, the content recommendation application may identify that subset of users 120 (e.g., subset 116) may be associated with certain types of media content (e.g., sports and news) and with certain consumption time slots (e.g., weekend afternoons and evenings). For example, the content recommendation application may determine that these types of contents and timeslots may be atypical of not-churned subset 114 and typical of churned subset 116.

At 122, the content recommendation application may use the identified time slots and content types to preemptively identify users who are at risk of churn. For example, the content recommendation application may examine content consumption history of user X. User X may have a consumption history that includes records 124, 126, and 128. Records 124, 126, and 128 may all indicate that user X consumed sports programming, "NFL Game", on Sunday around 2:00 PM. Then, the content recommendation application may determine that consumption records of user X includes consumption of content typical of subset 116 at timeslots that are also typical of subset 116. Additionally, the content recommendation application may determine that consumption records of user X do not include consumption of content typical of subset 114 at timeslots that are also typical of subset 116.

After the determination in step 122 is made, the content recommendation application may, at step 130, generate a recommendation 132 for the user (e.g., for user X). In one example, the content recommendation application may generate a recommendation designed to identify content that is of the type typical of subset 114 and that would occur in a time slot that is typical of subset 114. For example, the content recommendation application may recommend the "Game of Thrones" TV show because it has type "Drama Series" which is typical of subset 114 and not typical of subset 116. The "Game of Thrones" TV show may also be scheduled (in case of cable providers) or scheduled for initial release (in case of OTT providers) for a time slot that is typical of subset 114 and not typical for subset 116 (e.g., Monday, 9:00 PM).

In the shown example, content recommendation 132 may include information about the type of recommended content 136, timeslot of the recommended content 138, and a user interface element 134 (e.g., a clickable button), which can allow the user to start consuming the content item. In some embodiments, content recommendation 132 may also include information about a promotion (e.g., free access to premium content) designed to encourage consumption of the recommended content item. The content recommendation 132 serves to expose user X to new types of content and new timeslots, and results in reduced risk of user X churning.

Figure 2:
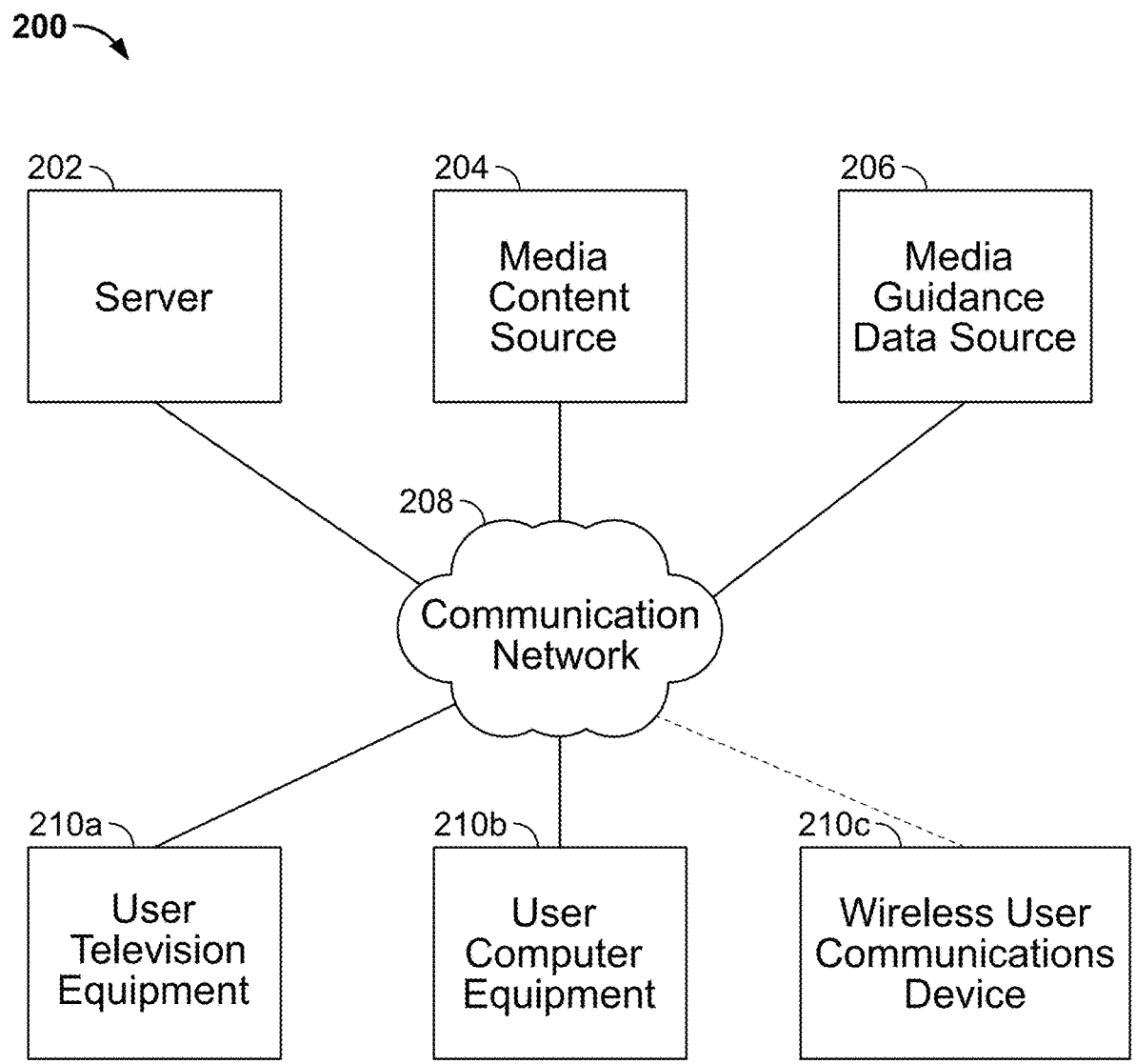
FIG. 2 depicts an illustrative block diagram of a system hosting the media delivery application, in accordance with some embodiments of the disclosure.

FIG. 2 shows an illustrative block diagram of a system 200 for displaying content, in accordance with some embodiments of the disclosure. In various aspects, system 200 includes one or more of server 202, media content source 204, media guidance data source 206, communication network 208, and one or more computing devices 210, such as user television equipment 210a (e.g., a set-top box), user computer equipment 210b (e.g., a laptop), and/or wireless user communications device 210c (e.g., a smartphone device). Although FIG. 2 shows one of each component, in various examples, system 200 may include fewer than the illustrated components and/or multiples of one or more illustrated components. Communication network 208 may be any type of communication network, such as the Internet, a mobile phone network, mobile voice or data network (e.g., a 4G or LTE network), cable network, public switched telephone network, or any combination of two or more of such communication networks. Communication network 208 includes one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. Communication network 208 communicatively couples various components of system 200 to one another. For instance, server 202 may be communicatively coupled to media content source 204, media guidance data source 206, and/or computing device 210 via communication network 208.

In some examples, media content source 204 and media guidance data source 206 may be integrated as one device. Media content source 204 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc.; ABC is a trademark owned by the American Broadcasting Company, Inc.; and HBO is a trademark owned by the Home Box Office, Inc. Media content source 204 may be the originator of content (e.g., a television broadcaster, a Webcast provider, etc.) or may not be the originator of content (e.g., an on-demand content provider, an Internet provider of content of broadcast programs for downloading, etc.). Media content source 204 may include cable sources, satellite providers, on-demand providers, Internet providers, over-the-top content providers, or other providers of content. Media content source 204 may also include a remote media server used to store different types of content (e.g., including video content selected by a user) in a location remote from computing device 210. Systems and methods for remote storage of content and providing remotely stored content to user equipment are discussed in greater detail in connection with Ellis et al., U.S. Pat. No. 7,761,892, issued Jul. 20, 2010, which is hereby incorporated by reference herein in its entirety.

Media content source 204 and media guidance data source 206 may provide content and/or media guidance data to computing device 210 and/or server 202 using any suitable approach. In some embodiments, media guidance data source 206 may provide a stand-alone interactive television program guide that receives program guide data via a data feed (e.g., a continuous feed or trickle feed). In some examples, media guidance data source 206 may provide program schedule data and other guidance data to computing device 210 on a television channel sideband, using an in-band digital signal, an out-of-band digital signal, or any other suitable data transmission technique.

As described in further detail below, server 202 manages the communication of a live content stream (e.g., a live sporting event broadcast, a live news broadcast, or the like) and recorded streams from media content source 204 to computing device 210 via communication network 208. For instance, in some embodiments, content from media content source 204 and/or guidance data from media guidance data source 206 may be provided to computing device 210 using a client/server approach. In such examples, computing device 210 may pull content and/or media guidance data from server 202 and/or server 202 may push content and/or media guidance data to computing device 210. In some embodiments, a client application residing on computing device 210 may initiate sessions with server 202, media content source 204, and/or media guidance data source 206 to obtain content and/or guidance data when needed, e.g., when the guidance data is out of date or when computing device 210 receives a request from the user to receive content or guidance data. In various aspects, server 202 may also be configured to detect events within the live content stream and, based on the detected events, control the display of content and/or navigation menu options via computing device 210. Additionally, although FIG. 2 shows media content source 204 and media guidance data source 206 as separate from server 202, in some embodiments, media content source 204 and/or media guidance data source 206 may be integrated as one device with server 202.

Content and/or media guidance data delivered to computing device 210 may be over-the-top (OTT) content. OTT content delivery allows Internet-enabled user devices, such as computing device 210, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may transfer only IP packets provided by the OTT content provider. Examples of OTT content providers include FACEBOOK, AMAZON, YOU-TUBE, NETFLIX, and HULU, which provide audio and video via IP packets. YouTube is a trademark owned by Google LLC; Netflix is a trademark owned by Netflix, Inc.; Hulu is a trademark owned by Hulu, LLC; Facebook is a trademark owned by Facebook, Inc.; and Amazon is a trademark owned by Amazon.com, Inc. OTT content providers may also include any other OTT content provider. OTT content providers may additionally or alternatively provide media guidance data described above. In addition to content and/or media guidance data, providers of OTT content can distribute applications (e.g., web-based applications or cloud-based applications), or the content can be displayed by applications stored on computing device 210.

Figure 3:
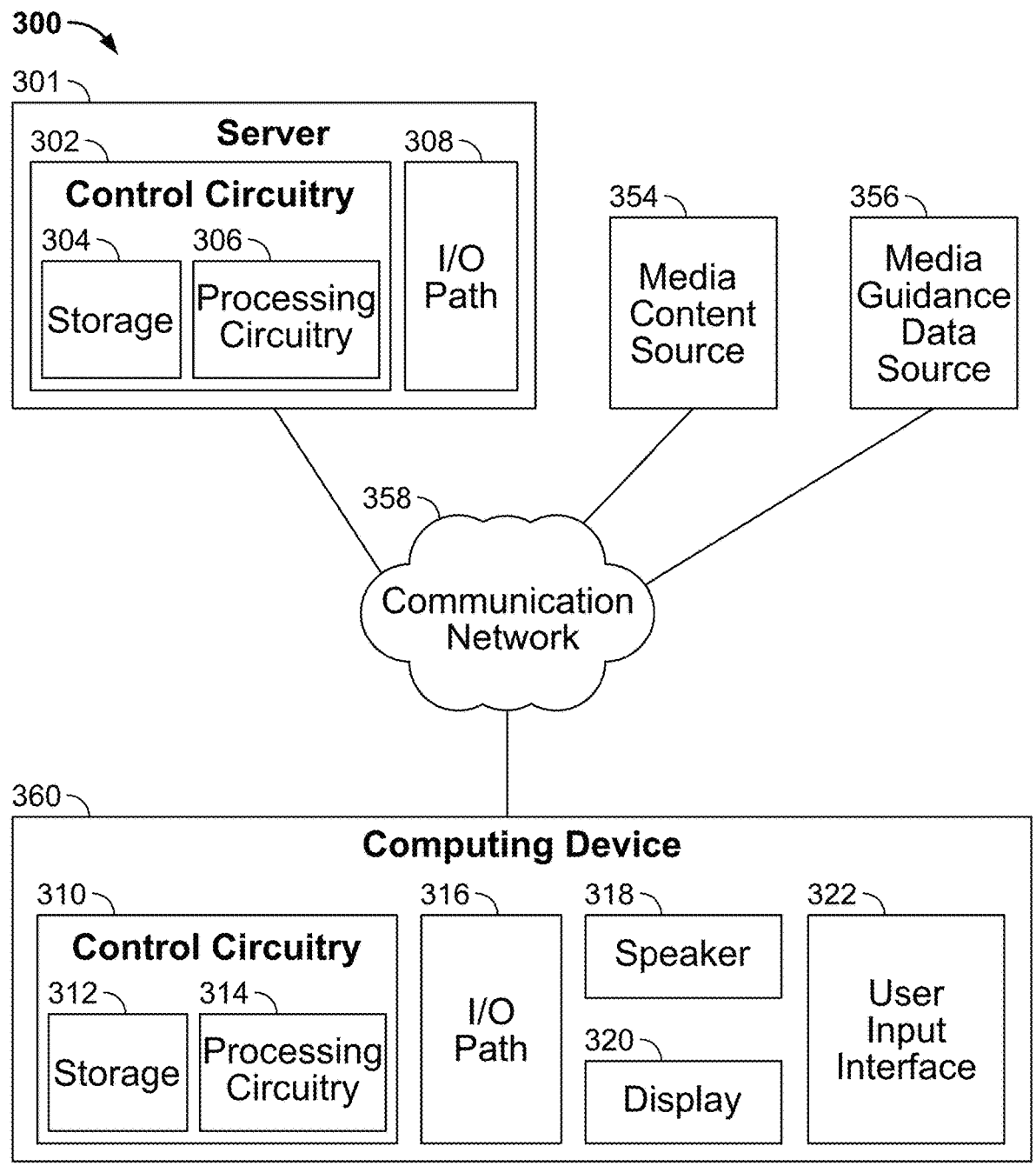
FIG. 3 shows an illustrative block diagram of a system hosting the content recommendation application, in accordance with some embodiments of the disclosure.

FIG. 3 is an illustrative block diagram showing additional details of the system 300 (which may be the same as system 200 of FIG. 2), in accordance with some embodiments of the disclosure. In particular, server 301 (e.g., the same server as server 202) includes control circuitry 302 and I/O path 308, and control circuitry 302 includes storage 304 and processing circuitry 306. Computing device 360 (e.g., one or more of devices 210a, 210, and 210c) includes control circuitry 310, I/O path 316, speaker 318, display 320 (as well a circuitry for generating images for display on display 320), and user input interface 322. Control circuitry 310 includes storage 312 and processing circuitry 314. Control circuitry 302 and/or 310 may be based on any suitable processing circuitry such as processing circuitry 306 and/or 314. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 304, storage 312, and/or storages of other components of system 300 (e.g., storages of media content source 354, media guidance data source 356, and/or the like) may be an electronic storage device. In some embodiments, media content source 354 may be the same as media content source 204. In some embodiments, media guidance data source 356 may be the same as media content source 206. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called a personal video recorders, or PVRs), solid state devices, quantum storage devices, gaming consoles, gaming media, or any other suitable fixed or removable storage devices, and/or any combination of the same. Each of storage 304, storage 312, and/or storages of other components of system 300 may be used to store various types of content, media guidance data, and or other types of data. Non-volatile memory may also be used (e.g., to launch a boot-up routine and other instructions). Cloud-based storage may be used to supplement storages 304, 312 or instead of storages 304, 312. In some embodiments, control circuitry 302 and/or 310 executes instructions for a content recommendation application stored in memory (e.g., storage 304 and/or 312). Specifically, control circuitry 302 and/or 310 may be instructed by the content recommendation application to perform the functions discussed herein. In some implementations, any action performed by control circuitry 302 and/or 310 may be based on instructions received from the content recommendation application. For example, the content recommendation application may be implemented as software or a set of executable instructions that may be stored in storage 304 and/or 312 and executed by control circuitry 302 and/or 310. In some embodiments, the content recommendation application may be a client/ server content recommendation application where only a client content recommendation application resides on computing device 360, and a server content recommendation application resides on server 301.

The content recommendation application may be implemented using any suitable architecture. For example, it may be a stand-alone content recommendation application wholly implemented on computing device 360. In such an approach, instructions for the content recommendation application are stored locally (e.g., in storage 312), and data for use by the content recommendation application is downloaded on a periodic basis (e.g., from an out-of-band feed, from an Internet resource, or using another suitable approach). Control circuitry 310 may retrieve instructions for the content recommendation application from storage 312 and process the instructions to perform the functionality described herein. Based on the processed instructions, control circuitry 310 may determine what action to perform when input is received from user input interface 322.

In client/server-based embodiments, control circuitry 310 may include communication circuitry suitable for communicating with a content recommendation application server (e.g., server 301) or other networks or servers. The instructions for carrying out the functionality described herein may be stored on the application server. Communication circuitry may include a cable modem, an integrated services digital network (ISDN) modem, a digital subscriber line (DSL) modem, a telephone modem, an Ethernet card, a wireless modem for communication with other equipment, or any other suitable communication circuitry. Such communication may involve the Internet or any other suitable communication networks or paths (e.g., communication network 358). In some embodiments, communication network 358 may be the same as network 208. In another example of a client/server-based application, control circuitry 310 runs a web browser that interprets web pages provided by a remote server (e.g., server 301). For example, the remote server may store the instructions for the application in a storage device. The remote server may process the stored instructions using circuitry (e.g., control circuitry 302) and generate the displays discussed above and below. Computing device 360 may receive the displays generated by the remote server and may display the content of the displays locally via display 320. This way, the processing of the instructions is performed remotely (e.g., by server 301) while the resulting displays, such as the display windows described elsewhere herein, are provided locally on computing device 360. For example, computing device 360 may include display circuitry (e.g., video card circuitry or combination motherboard and video card circuitry) configured to generate for display the display windows. Computing device 360 may receive inputs from the user via input interface 322 and transmit those inputs to the remote server for processing and generating the corresponding displays.

A user may send instructions to control circuitry 302 and/or 310 using user input interface 322. User input interface 322 may be any suitable user interface, such as a remote control, trackball, keypad, keyboard, touchscreen, touchpad, stylus input, joystick, voice recognition interface, or other user input interfaces. User input interface 322 may be integrated with or combined with display 320, which may be a monitor, television, liquid crystal display (LCD), electronic ink display, or any other equipment suitable for displaying visual images.

Server 301 and computing device 360 may receive content and data via input/output (hereinafter "I/O") path 308 and 316, respectively. For instance, I/O path 316 may include circuitry that includes one or more of communication port configured to receive a live content stream from server 301 and/or media content source 354 via a communication network 358. Storage 312 may be configured to buffer the received live content stream for playback, and display 320 may be configured to present the buffered content, navigation options, alerts, and/or the like via a primary display window and/or a secondary display window. I/O paths 308, 316 may provide content (e.g., a live stream of content, broadcast programming, on-demand programming, Internet content, content available over a local area network (LAN) or wide area network (WAN), and/or other content) and data to control circuitry 302, 310. Control circuitry 302, 310 may be used to send and receive commands, requests, and other suitable data using I/O paths 308, 316. I/O paths 308, 316 may connect control circuitry 302, 310 (and specifically processing circuitry 306, 314) to one or more communication paths (described below). I/O functions may be provided by one or more of these communication paths but are shown as single paths in FIG. 3 to avoid overcomplicating the drawing.

Figure 4:
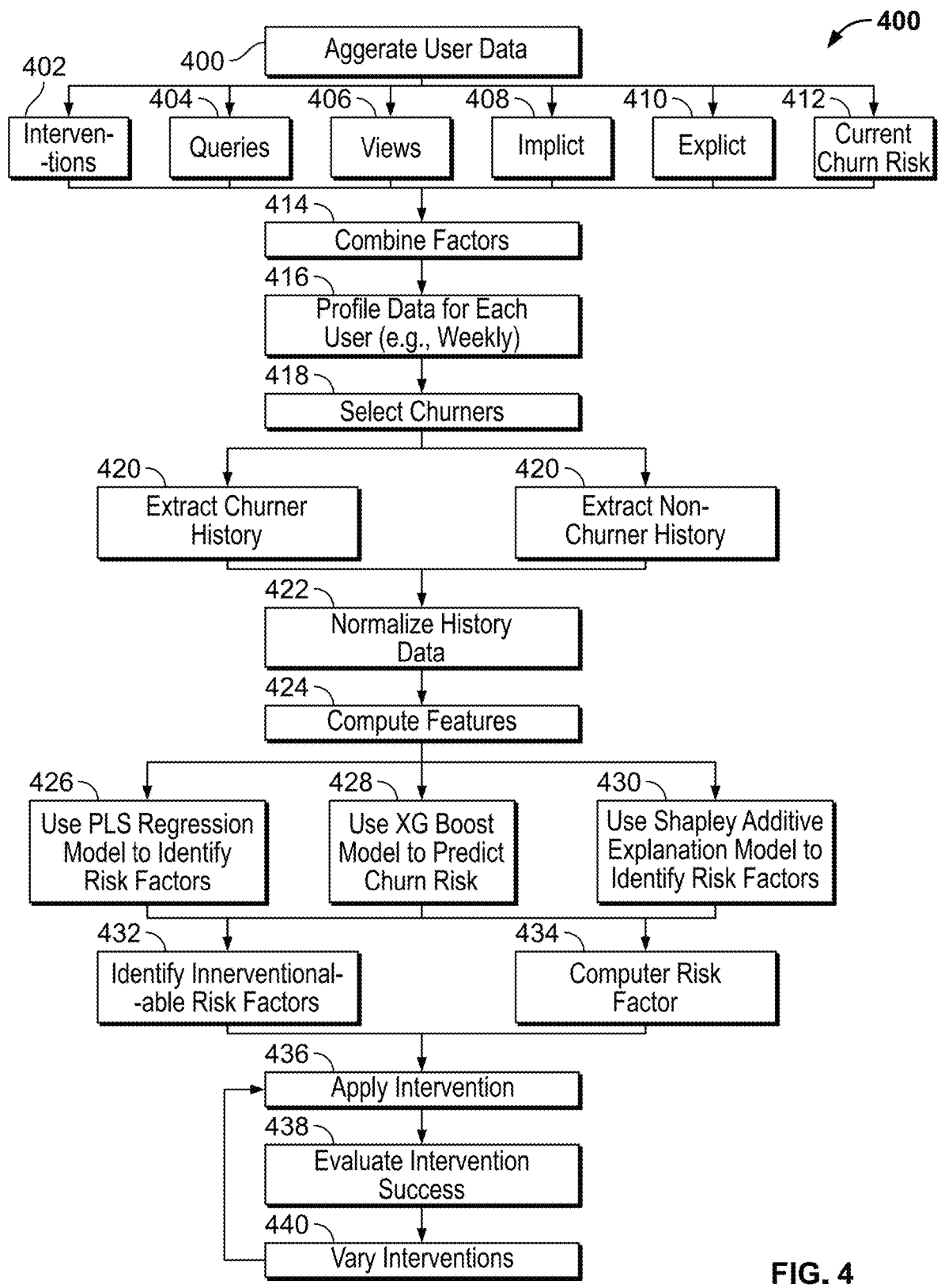
FIG. 4 depicts an illustrative flowchart of a process for providing interventions, in accordance with some embodiments of the disclosure.

Having described systems 200 and 300, reference is now made to FIG. 4, which depicts an illustrative flowchart of process 400 for providing media content recommendations that may be implemented by using systems 200 and 300, in accordance with some embodiments of the disclosure. In various embodiments, the individual steps of process 400 may be implemented by one or more components of systems 200 and 300. Although the present disclosure may describe certain steps of process 400 (and of other processes described herein) as being implemented by certain components of systems 200 and 300, this is for purposes of illustration only, and it should be understood that other components of systems 200 and 300 may implement those steps instead. For example, the steps of process 400 may be executed by server 301 and/or by computing device 360 to provide content recommendations.

At step 402, control circuitry 310 aggregates user data of a user subscribed to a media service (e.g., an OTT or cable provider). For example, control circuitry 310 may access data stored at server 301 of the OTT or cable provider or at media guidance data source 356 via network 358 and compile it into a local data structure. The data may include user information (e.g., information about users in a certain area or of certain demographic category) over a certain time period (e.g., 2 months). For example, the data may include types of data received in steps 402-412, as described below.

At 406, control circuitry 310 may receive view or consumption data of the users. For example, view or consumption data may describe the content consumed by each user, how much is viewed, when it is viewed, etc. At 404, control circuitry 310 may receive query data of the users. For example, query data may include the content and timing of queries received by a media service from the users. At 410, control circuitry 310 may receive explicit data. For example, explicit user data may include data that describes how often a user uses search, recommendations and, predictions; how the user clicks on content or records content; and when the user uses other media service features. In some embodiments, explicit user data may also include demographic information about the user (e.g., age, location, sex, etc.). At 408, control circuitry 310 may receive implicit data. For example, implicit data may include contextual metadata about content items requested by users: properties of the content: genre, length, time slot, year of production, popularity at time of viewing, content themes (e.g., content themes that are determined using natural language processing).

Additionally, at 412, control circuitry 310 may receive current churn risk data for each user as calculated in step 434. In this way, past information about churn risk may be a factor in computing future churn factors. At 402, control circuitry 310 may also receive any interventions that were provided to the users, as will be described in steps 436-440. In this way past information about interventions may be a factor in computing future churn factors.

At 414, control circuitry 310 may normalize and combine the data received in steps 402-412. In some embodiments, control circuitry 310 may normalize and scale the features received in steps 402-412 to reduce the effect of seasonal trends and possible numerical issues with model optimization. For example, each feature may be assigned a numerical value that is normalized on 1-100 scale. In one implementation, control circuitry 310 may create combinations of features, and also create "delta" features (e.g., features that numerically measure change in other features over time). For example, the number of sports programming requests may be tracked, and, separately, a change in the number of sports programming requests (e.g., over a week or over a month) may also be tracked. As another example, control circuitry 310 may track user requests for content at certain time slots. For example, control circuitry 310 may track when content is consumed, e.g., at 9:00 PM on Mondays or at 6:00 AM on Sundays.

At 416, control circuitry 310 may then access profiles of several users that are to be monitored for churn. For example, all users of the media service may be monitored. In some embodiments, only certain key demographics may be monitored. For example, control circuitry 310 may retrieve subscriber data from server 301 or media guidance data source 356 via network 358. At 418, control circuitry 310 may use the profile data to identify users that have discontinued the media service. For example, control circuitry 310 may identify an explicit cancellation order in profile data. At 420, control circuitry 310 may create a subset of users who have churned and a subset of users who have not churned. Then, control circuitry 310 may extract factors computed in steps 414 for each set of users. At 422, the data may be normalized between churners and non-churners. For example, non-churners who stayed subscribed for a full month may be expected to request more content than those who canceled the service after 15 days, simply because they had more days to consume content. The normalization may account for this discrepancy by extrapolating the number of requests for churners as if they were subscribed for the full month (e.g., if 5 requests were received over 15 days, control circuitry 310 may extrapolate that to 10 requests.)

At 424, control circuitry 310 may compute features for input into analysis models at 426-430. For example, control circuitry 310 may prune some of the factors, create combination factors, generate numerical scores for each factor, etc. In some embodiments, control circuitry 310 may combine or average features of multiple users (e.g., users of the same demographics, or uses in the same geographical area). The created features for both the set of churners and the set of non-churners will be fed into adjustable models (e.g., at steps 426-428) that can identify key factors that led to a user being included into the set of churners rather than into the set of non-churners.

In some embodiments, control circuitry 310 may perform any one of steps 426-430, or any combination of these steps to identify key features in step 424 (e.g., consumption of key types of content, or consumption of content in key time slots) that predict inclusion of the user in the set of churners. For example, at step 426, control circuitry 310 may use a partial least squares (PLS) algorithm that takes two sets of features (e.g., features of the churner set and features of the non-churner set) and identifies key features that predict inclusion of a user in the churner set. PLS techniques are described, for example in Struc, V. and Pavesic, N. (2009). Gabor-Based Kernel Partial-Least-Squares Discrimination Features for Face Recognition. Informatica, vol. 20, No. 1, 115-138 (which is incorporated by reference herein). At step 428, control circuitry 310 may use an Extreme Gradient (XG) boost model algorithm that takes two sets of features (e.g., features of the churner set and features of the non-churner set) and identifies key features that predict inclusion of a user in the churner set. XG boost techniques are described, for example, in L. Torlay, et al., Machine Learning-XG Boost Analysis Of Language Networks To Classify Patients With Epilepsy, Brain Informatics, 2017, 4:65 (which is incorporated by reference herein). At step 430, control circuitry 310 may use a Shapley additive explanation model algorithm that takes two sets of features (e.g., features of the churner set and features of the non-churner set) and identifies key features that predict inclusion of a user in the churner set. Shapley additive explanation techniques are described, for example in Scott M. Lundberg, A Unified Approach to Interpreting Model Predictions, Advances in Neural Information Processing Systems 30, NIPS 2017 (which is incorporated by reference herein). The results of steps 426-430 may be combined or weighted and then combined. In some embodiments, as a result of steps 426-430, control circuitry 310 generates a list of features that are most responsible for sorting users into the churned set and a list of features that are most responsible for placing users into the non-churned set.

At 434, control circuitry 310 may use the features identified in steps 426-430 to compute a risk factor for each user of a media service. For example, users that display features identified as typical of the set of churners receive a high churn score, while users that display features identified as typical of the set of non-churners receive a low churn score. The churn score can also be fed back into the data set at 412. For example, a user having a churn risk of 89% in January can be used as a feature (e.g., in step 424) to identify churn risk in February. The change in churn risk (e.g., a sharp increase in churn risk) can also be used as a separate feature in step 424.

Additionally, at step 432, control circuitry 310 may identify some risk factor as intervention-able. For example, control circuitry 310 may have identified consumption media content at certain timeslots or of certain types as key factors in churn. These factors may be intervention-able, because the recommendations may be generated to direct the users towards different timeslots or content types. Such recommendations may be one possible intervention. Other interventions may include offers for free content, information emails, social media messages, or recommendations presented on user interface of the media service.

At 436, control circuitry 310 may select an intervention (e.g., a content item to recommend via user interface). The content item may be selected using a model that takes user data as input and produces a selected content item as output. The content item may be selected from a database stored at media guidance data source 356. Then, control circuitry 310 may generate for display the selected recommendation to the user (e.g., via display 320). At 438, control circuitry 310 may evaluate effectiveness of the intervention (e.g., by checking if the risk factor computed at 434 has decreased and/or based on whether the user has churned or not.) At 440, control circuitry 310 may vary interventions and track success by repeating steps 436-438. In some embodiments, control circuitry 310 may adjust selection algorithm to select better recommendations. In addition, the data about applied interventions may be fed back into churn prediction models at step 402 and then used as a feature in step 424.

Figure 5:
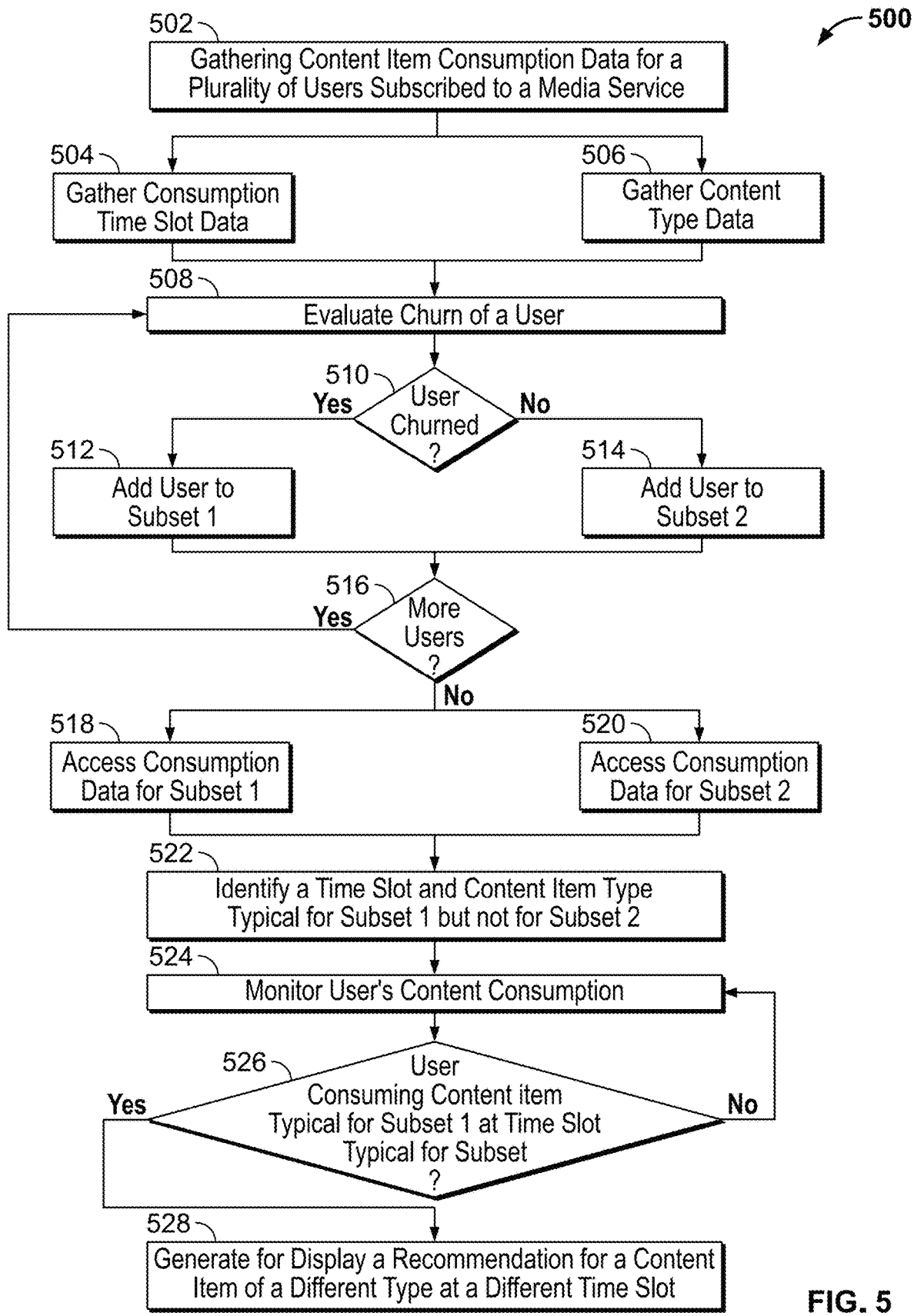
FIG. 5 depicts an illustrative flowchart of a process for providing media content recommendations, in accordance with some embodiments of the disclosure.

FIG. 5 depicts an illustrative flowchart of process 500 for a process for providing media content recommendations that may be implemented by using systems 200 and 300, in accordance with some embodiments of the disclosure. In various embodiments, individual steps of process 500 may be implemented by one or more components of systems 200 and 300. Although the present disclosure may describe certain steps of process 500 (and of other processes described herein) as being implemented by certain components of systems 200 and 300, this is for purposes of illustration only, and it should be understood that other components of systems 200 and 300 may implement those steps instead. For example, steps of process 500 may be executed by server 301: and/or by computing device 360 to provide content recommendations.

At step 502, control circuitry 310 may access and gather content item consumption data for a plurality of users subscribed to a media service (e.g., all users subscribed to a service provided by media content sources 354 or server 301). In some embodiments, at 504, control circuitry 310 may gather content item consumption data that comprises information about time slots when content items are consumed by users (e.g., as shown by elements 106-110 of FIG. 1). Similarly, at 506 control circuitry 310 may gather the content item consumption data that comprises information about the types of content items (e.g., if it is a movie or TV series, what the genre is, what the theme, etc.) that are consumed by users (e.g., as shown by elements 106-110 of FIG. 1).

At step 508, control circuitry 310 evaluates user data (e.g., date from server 301) to identify a first subset of the plurality of users that have unsubscribed from the media service during a predetermined time period (e.g., 1 month) and a second subset of the plurality of users that have not unsubscribed from the media service during the predetermined time period. For example, control circuitry 310 may evaluate a database of users for explicit instructions to cancel the account by using steps 510-516.

At step 510, control circuitry 310 may begin examining each of the plurality of the usernames of the plurality of users, and checking a user database (e.g., stored on server 301) to see if the username of that user appeared in the list of disconnection requests. If the user has churned, control circuitry 310 may, at step 512, add that user to the first subset. If the user has not churned, control circuitry 310 may, at step 514, add that user to the second subset. At step 516, control circuitry 310 checks if there are more users to be evaluated, if so process 500 returns back to steps 510, if not, control circuitry 310 proceeds to steps 518-520.

At steps 518 and 520, control circuitry 310 uses the data access at step 502 to access item consumption data for the first subset of users and to accesses item consumption data for the second subset of users. For example, control circuitry 310 may generate a single table or database of data for the first subset of users and another single table or database of data for the second subset of users.

At 522, control circuitry 310 may identify a time slot typical for the first subset of users and atypical for the second subset of users, based on content item consumption data of the first subset of users and content item consumption data of the second subset of users. In one implementation, the typical timeslot may be identified using one of a PLS regression model, XG boost model, or Shapley additive explanation model, as described in steps 426-430. In another implementation, control circuitry 310 may calculate a first fraction of the first subset of users that have consumed content items in a certain time slot and a second fraction of the second subset of users that have consumed content items in the time slot. That time slot may then be considered typical for the first subset if the first fraction exceeds a first typicality threshold and if the second fraction is less than a second typicity threshold. Similarly, that time slot may then be considered typical for the second subset if the first fraction does exceed the first typicality threshold and if the second fraction does exceed the second typicality threshold.

At 522, control circuitry 310 may also identify a content item typical for the first subset of users and atypical for the second subset of users based on the content item consumption data of the first subset of users and the content item consumption data of the second subset of users. In one implementation, the typical content type may be identified using at least one of PLS regression model, XG boost model, or Shapley additive explanation model as described in steps 426-430.

At 524, control circuitry 310 may begin monitoring content consumption of a certain user of media service provided by media content source 354 or server 301. For example, control circuitry 310 may receive a feed of content consumption from media content source 354 or server 301. At 526, control circuitry 310 may determine that the user is consuming media content in a timeslot that is typical of the first subset (the set that has churned). In some embodiments, the user may also be consuming media content that has a type that is typical of the first subset of users (e.g., the churner subset). In response to one or both of these determinations, control circuitry 310 may proceed to step 528. In some embodiments, control circuitry 310 may also check if the user has not accessed a content item that is typical of the second subset of users (e.g., the non-churner subset) for a certain period of time (e.g., 2 weeks). This may serve as additional requirement for control circuitry 310 to proceed to step 528.

At 528, control circuitry 310 may generate for the user a recommendation (e.g., as shown in FIG. 1, element 132). The recommendation can be delivered via network 358 from server 301. The recommendation can be generated for display on display 320 using display circuitry. In some embodiments, the recommendation includes an identifier of a content item that is scheduled for a time slot that is different from the time slot identified as typical of the first subset at step 522. The recommended content item may also have a content type that is different from the content type identified as typical of the first subset at step 522. Furthermore, the content item of the recommendations may be scheduled for a time slot that is identical to the time slot identified as typical of the second subset at step 522. The content item of the recommendations may also be of a content type that is identical to the content type identified as typical of the second subset at step 522.

In some embodiments, control circuitry 310 may generate for display the recommendation only after determining that the user has not consumed any content typical of the second subset for a set period of time (e.g., 2 weeks or one months). For example, control circuitry 310 may examine consumption data and track the last time content typical of the second subset (e.g., of a content type typical of the second subset and/or watched in a time slot typical of the second subset) was consumed. When that value gets large enough, control circuitry 310 may generate for display the recommendation as described above.

Figure 6:
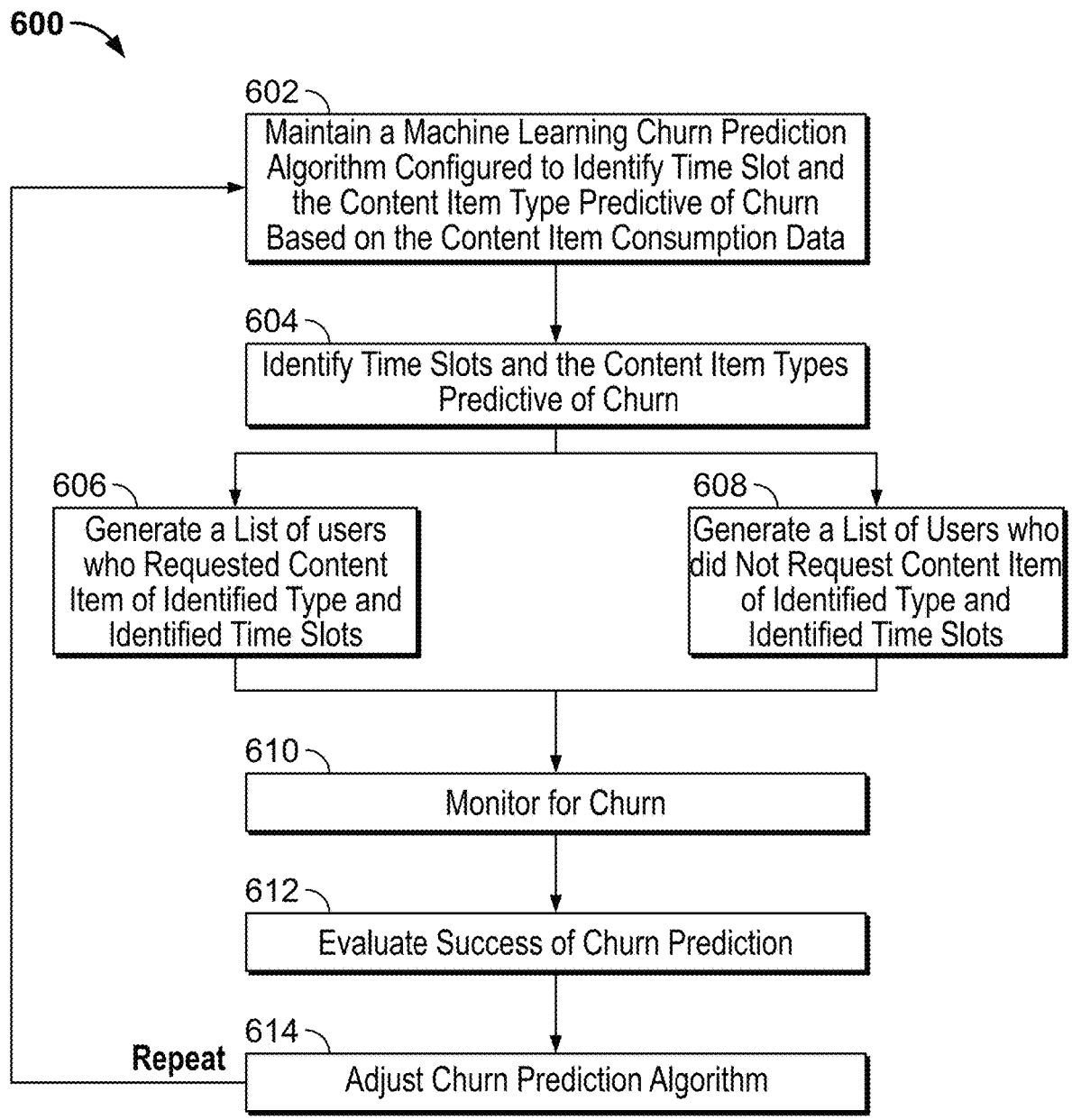
FIG. 6 depicts an illustrative flowchart of a process for adjusting a churn prediction algorithm, in accordance with some embodiments of the disclosure.

FIG. 6 depicts an illustrative flowchart of process 600 for adjusting a churn prediction algorithm that may be implemented by using systems 200 and 300, in accordance with some embodiments of the disclosure. In various embodiments, the individual steps of process 600 may be implemented by one or more components of systems 200 and 300. Although the present disclosure may describe certain steps of process 600 (and of other processes described herein) as being implemented by certain components of systems 200 and 300, this is for purposes of illustration only, and it should be understood that other components of systems 200 and 300 may implement those steps instead. For example, the steps of process 600 may be executed by server 301 and/or by computing device 360 to provide content recommendations. In some embodiments, control circuitry 310 may use process 600 as a part of process 500 of FIG. 5 (e.g., in addition to or instead of step 522). For example, control circuitry 310, when performing step 522, may use process 600 to identify typical time slots and content types.

At 602, control circuitry 310 may maintain a machine learning churn prediction algorithm configured to identify a time slot predictive of churn based on the content item consumption data. For example, control circuitry 310 may maintain at least one of a PLS regression algorithm, XG boost algorithm, or Shapley additive explanation algorithm as described in steps 426-430. The algorithms may be stored in local memory 312 or at remote server 301.

At step 604, control circuitry 310 may identify time slots and content types typical of the first subset of users (e.g., as described in step 522). Then, the typicality of the time slot and content types may be empirically tested at steps 606 and 608. At 606, control circuitry 310 generates a list of users who requested content items at the times identified as typical of the churned users, and/or of users who requested content items of the content type identified as typical of the churned users. At 608, control circuitry 310 generates a list of users who did not request content items at the times identified as typical of the churned users, and/or of users who did not request content items of the content type identified as typical of the churned users.

At step 610, control circuitry 310 empirically monitors whether the users in the list generated in step 606 actually churn, and whether users in list generated at step 608 actually did not churn. At step 612, the success rate is evaluated. If the success rate is low, at step 614, changes may be made to the algorithms that select typical time slots and content types. For example, algorithm parameters of a PLS regression algorithm, XG boost algorithm, or Shapley additive explanation algorithm may be adjusted. The process may then be repeated until precision rate stops improving.

Figure 7:
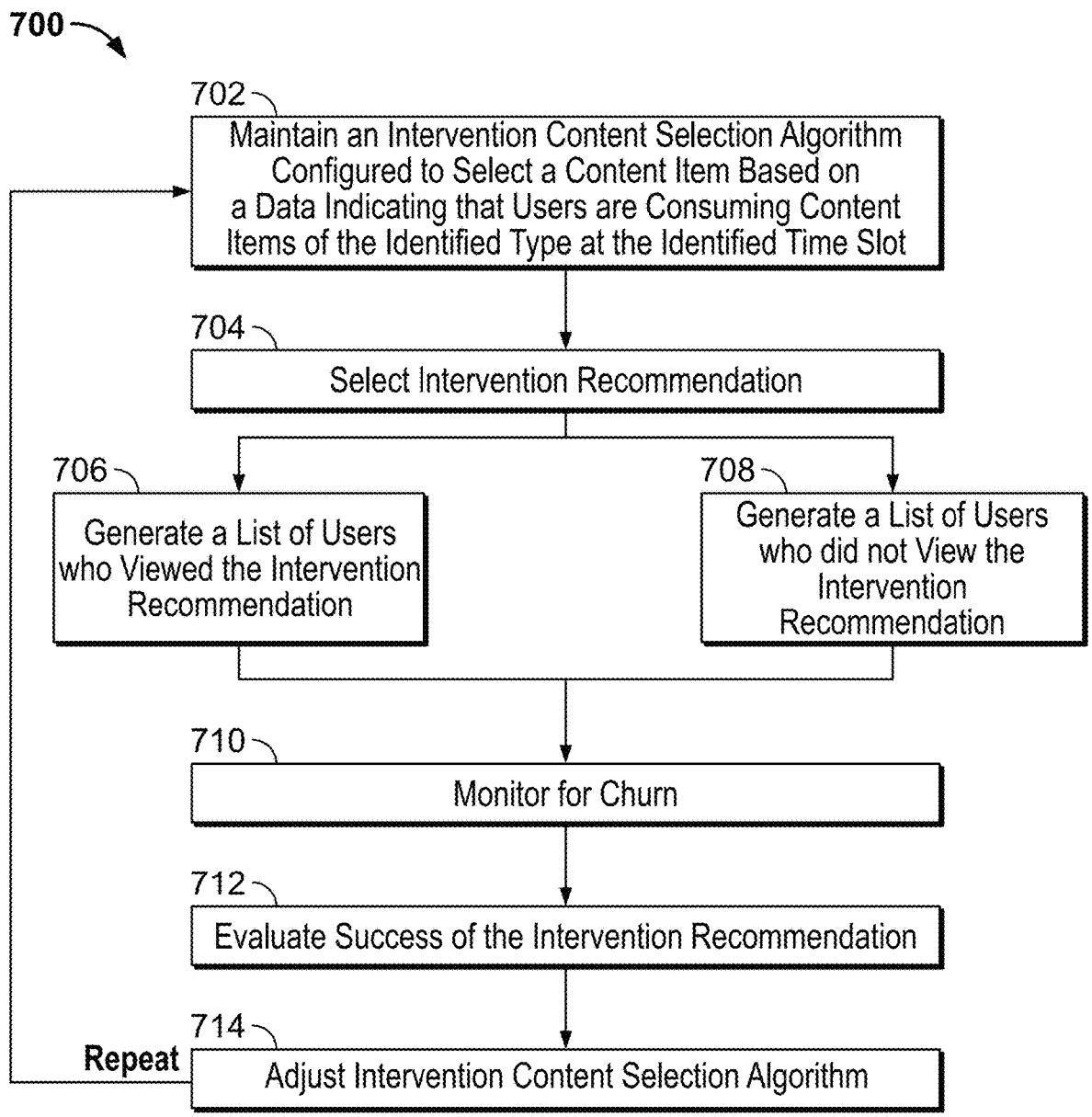
FIG. 7 depicts an illustrative flowchart of a process for adjusting an intervention selection algorithm, in accordance with some embodiments of the disclosure.

FIG. 7 depicts an illustrative flowchart of process 700 for adjusting an intervention selection algorithm that may be implemented by using systems 200 and 300, in accordance with some embodiments of the disclosure. In various embodiments, the individual steps of process 600 may be implemented by one or more components of systems 200 and 300. Although the present disclosure may describe certain steps of process 700 (and of other processes described herein) as being implemented by certain components of systems 200 and 300, this is for purposes of illustration only, and it should be understood that other components of systems 200 and 300 may implement those steps instead. For example, the steps of process 700 may be executed by server 301 and/or by computing device 360 to provide content recommendations. In some embodiments, control circuitry 310 may use process 700 as a part of process 500 of FIG. 5 (e.g., in addition to or instead of step 522). For example, control circuitry 310, when performing step 528?, may use process 700 to generate a recommendation (which is a type of intervention).

At 702, control circuitry 310 may maintain a machine learning content recommendation selection algorithm configured to identify a content recommendation designed to prevent churn based on the user profile data (e.g., media consumption data). For example, control circuitry 310 may maintain a learning neural network that connects user profile features to a selection of content items from media guidance data sources 356 via a set of neurons and uses churn avoidance as a reward function for adjusting weights of neuron connections.

At 704, control circuitry 310 may use the content recommendation selection algorithm to select an intervention recommendation for a certain type of users (e.g., users that consume media content at times typical of users who churn). The intervention may be one of email, automated phone call, a mobile push notification, or pop up on display 320 that recommends a content item to a user (e.g., as shown in FIG. 1, element 132). The media item that is being selected as a recommended item for the intervention may be selected using the neural network described above.

At 706-708, control circuitry 310 may conduct AB testing of the intervention. For example, control circuitry 310 may deliver the recommendations to some users in step 706, but not to other users in step 708. Control circuitry 310 may generate two lists listing such user groups. At 710 both lists of users may be monitored for churn. At 712, control circuitry 310 may evaluate the success of the intervention. For example, if significantly fewer users who saw the intervention have churned than users who have not seen the intervention, the intervention may receive a high score. On the other hand, if there is little or no difference in churn rates, the intervention may receive a low score.

At 714, control circuitry 310 may adjust the intervention selection algorithm. For example, the neural network that selects the content item may be adjusted using the intervention score as the reward score and using neural network adjustment algorithms that attempt to maximize the reward score. Once the intervention selection algorithm is adjusted, steps 702-714 may be repeated to further refine the intervention selection algorithms.

Figure 8:
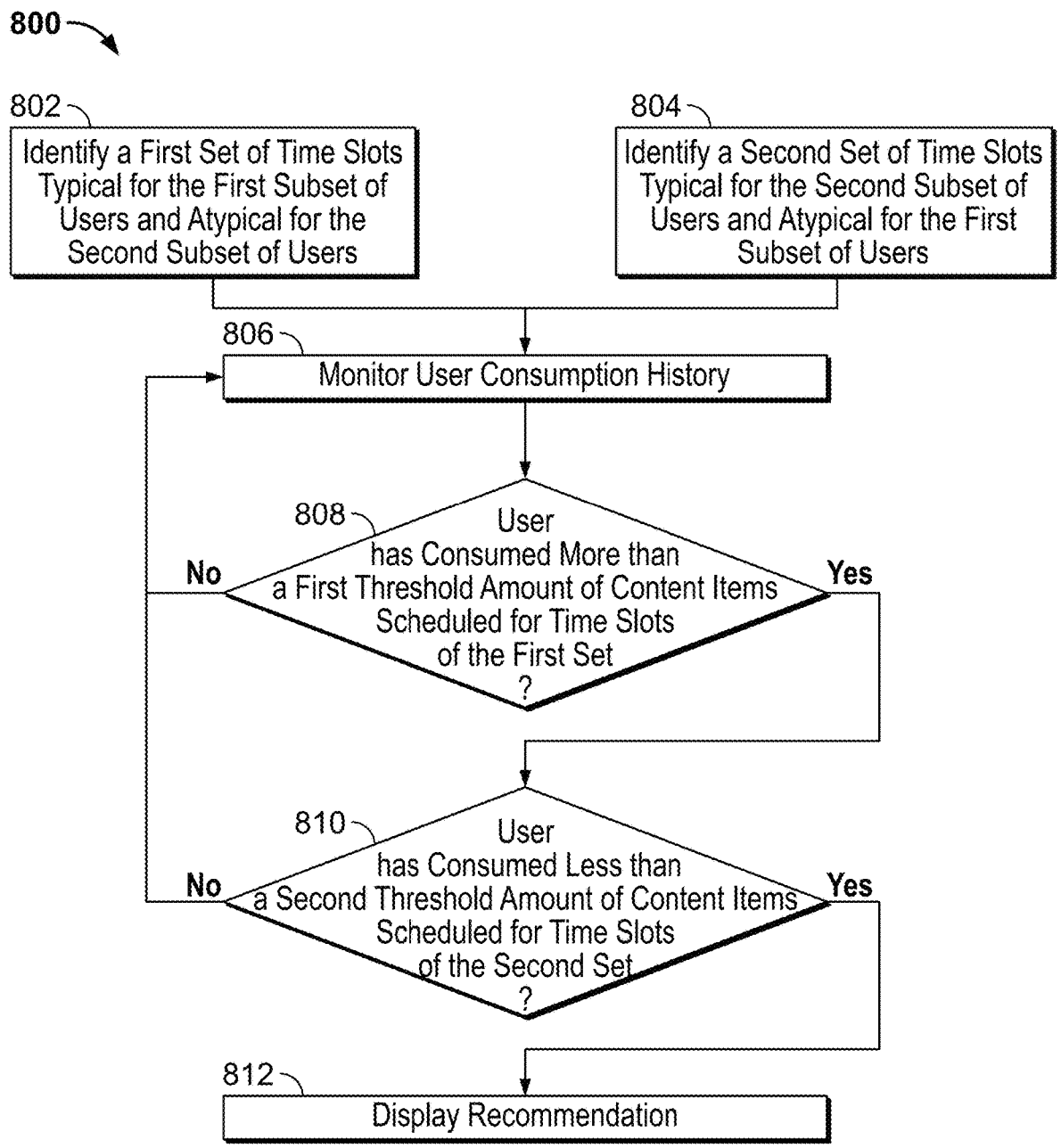
FIG. 8 depicts another illustrative flowchart of a process for providing interventions, in accordance with some embodiments of the disclosure.

FIG. 8 depicts another illustrative flowchart of process 800 for providing interventions that may be implemented by using systems 200 and 300, in accordance with some embodiments of the disclosure. In various embodiments, the individual steps of process 800 may be implemented by one or more components of systems 200 and 300. Although the present disclosure may describe certain steps of process 800 (and of other processes described herein) as being implemented by certain components of systems 200 and 300, this is for purposes of illustration only, and it should be understood that other components of systems 200 and 300 may implement those steps instead. For example, the steps of process 800 may be executed by server 301 and/or by computing device 360 to provide content recommendations. In some embodiments, control circuitry 310 may use process 800 as a part of process 500 of FIG. 5 (e.g., in addition to or instead of steps 522-528).

At step 802, control circuitry 310 may identify a set of time slots typical of the first subset of users identified in step 512 and atypical of the second subset of users identified in step 514. At step 804, control circuitry 310 may identify a set of time slots typical of the second subset of users identified in step 514 and atypical of the first subset of users identified in step 512. For example, this may be accomplished using one of a PLS regression model, XG boost model, or Shapley additive explanation model as described in steps 426-430. Once the sets of timeslots are identified, control circuitry 310 may proceed to step 806.

At step 806, control circuitry 310 may monitor the consumption history of a certain user. For example, control circuitry 310 may receive user data from server 301 or from media guidance data source 356. The data is used to identify whether the user consumes content with a pattern indicative of a user who might churn. To that end, at step 808, control circuitry 310 checks if the user has consumed more than a first threshold amount of content items scheduled for time slots identified at step 802. If not, control circuitry 310 continues monitoring at step 806. Otherwise, control circuitry 310 also checks, at step 810, whether the user has consumed less than a second threshold amount of content items scheduled for time slots identified at step 804. If not, control circuitry 310 continues monitoring at step 806. Otherwise, control circuitry 310 proceeds to step 812. At step 812, control circuitry 310 may generate for display for that user a recommendation (e.g., recommendation 132 of FIG. 1).

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for providing content recommendations to prevent user churn, the method comprising:
   accessing content item consumption data for a plurality of users previously or currently subscribed to a media service, wherein the content item consumption data comprises information about time slots when content items are consumed by users;
   determining, by querying a database, that a first subset of the plurality of users has unsubscribed from the media service during a predetermined time period and that a second subset of the plurality of users has not unsubscribed from the media service during the predetermined time period;
   identifying a time slot typical for the first subset of users and atypical for the second subset of users based on content item consumption data of the first subset of users and content item consumption data of the second subset of users;
   determining that a user is consuming a first content item at the identified time slot; and
   in response to determining that the user is consuming the first content item at the identified time slot, generating for display a recommendation for a second content item, wherein the second content item is scheduled for a time slot that is different from the identified time slot.

2. The method of claim 1, wherein the content item consumption data further comprises content item type information, the method further comprising:
   identifying a content item type typical for the first subset of users and atypical for the second subset of users based on the content item consumption data of the first subset of users and the content item consumption data of the second subset of users; and
   wherein the first content item is of a type that is the same as the identified content type, and the second content item is of a type that is the different from the identified content type.

3. The method of claim 1, further comprising:
   maintaining a machine learning churn prediction algorithm configured to identify a time slot predictive of churn based on the content item consumption data;
   iteratively adjusting the machine learning churn prediction algorithm based on the identified time slot to accurately predict a user unsubscribing from the media service; and
   wherein the identifying the time slot comprises identifying the time slot using the adjusted machine learning churn prediction algorithm.

4. The method of claim 1, further comprising:
   maintaining an intervention selection algorithm configured to select a content item based on data indicating that users are consuming content items at the identified time slot;
   iteratively adjusting the intervention selection algorithm based on the user not unsubscribing from the media service after viewing a recommendation for the selected content item; and
   wherein the generating for display the recommendation comprises generating for display a recommendation for the content item selected using the adjusted intervention content selection algorithm.

5. The method of claim 1, wherein:
   identifying the time slot that is typical for the first subset of users comprises:
      calculating a first fraction of the first subset of users that have consumed content items at the time slot; and
      determining that the first fraction exceeds a typicality threshold; and
   identifying that the time slot is atypical for the second subset of users comprises:
      calculating a second fraction of the second subset of users that have consumed content items at the time slot; and
      determining that the second fraction does not exceed a typicality threshold.

6. The method of claim 1, further comprising:
   identifying a time slot typical for the second subset of users and atypical for the first subset of users based on content item consumption data of the first subset of users and content item consumption data of the second subset of users; and
   wherein the generating for display the recommendation for the second content item is performed in response to determining that the user has not consumed content at the time slot typical for the second subset of users for a predetermined period of time.

7. The method of claim 6, wherein the second content item is scheduled for the time slot typical for the second subset of users and atypical for the first subset of users.

8. The method of claim 1, further comprising:
identifying a first set of time slots typical for the first subset of users and atypical for the second subset of users based on content item consumption data of the first subset of users and content item consumption data of the second subset of users;
identifying a second set of time slots typical for the second subset of users and atypical for the first subset of users based on content item consumption data of the first subset of users and content item consumption data of the second subset of users;
wherein generating for display the recommendation for the second content item is performed in response to determining that the user has consumed more than a first threshold amount of content items scheduled for time slots of the first set and has consumed less than a second threshold amount of content items scheduled for time slots of the second set over a predetermined time period.

9. The method of claim 1, wherein the generating for display a recommendation for the second content item comprises generating for display an incentive to consume the second content item.

10. The method of claim 1, wherein the identifying the time slot typical for the first subset of users and atypical for the second subset of users comprises using at least one of regression model and Shapley additive explanation model.

11. A system for providing content recommendations to prevent user churn, the system comprising:
control circuitry configured to:
access content item consumption data for a plurality of users previously or currently subscribed to a media service, wherein the content item consumption data comprises information about time slots when content items are consumed by users;
determine, by querying a database, that a first subset of the plurality of users has unsubscribed from the media service during a predetermined time period and that a second subset of the plurality of users has not unsubscribed from the media service during the predetermined time period;
identify a time slot typical for the first subset of users and atypical for the second subset of users based on content item consumption data of the first subset of users and content item consumption data of the second subset of users;
determine that a user is consuming a first content item at the identified time slot; and
in response to determining that the user is consuming the first content item at the identified time slot, generate for display, using display circuitry, a recommendation for a second content item, wherein the second content item is scheduled for a time slot that is different from the identified time slot.

12. The system of claim 11, wherein the content item consumption data further comprises content item type information, and wherein the control circuitry is further configured to:
identifying a content item type typical for the first subset of users and atypical for the second subset of users based on the content item consumption data of the first subset of users and the content item consumption data of the second subset of users; and
wherein the first content item is of a type that is the same as the identified content type, and the second content item is of a type that is the different from the identified content type.

13. The system of claim 11, wherein the control circuitry is further configured to:
maintain a machine learning churn prediction algorithm configured to identify a time slot predictive of churn based on the content item consumption data;
iteratively adjust the machine learning churn prediction algorithm based on the identified time slot to accurately predict a user unsubscribing from the media service; and
wherein the control circuitry is configured to identify the time slot by identifying the time slot using the adjusted machine learning churn prediction algorithm.

14. The system of claim 11, wherein the control circuitry is further configured to:
maintain an intervention selection algorithm configured to select a content item based on data indicating that users are consuming content items at the identified time slot;
iteratively adjust the intervention selection algorithm based on the user not unsubscribing from the media service after viewing a recommendation for the selected content item; and
wherein the control circuitry is configured to generate for display the recommendation by generating for display a recommendation for the content item selected using the adjusted intervention content selection algorithm.

15. The system of claim 11, wherein:
the control circuitry is configured to identify the time slot that is typical for the first subset of users by:
calculating a first fraction of the first subset of users that have consumed content items at the time slot; and
determining that the first fraction exceeds a typicality threshold; and
the control circuitry is configured to identify that the time slot is atypical for the second subset of users by:
calculating a second fraction of the second subset of users that have consumed content items at the time slot; and
determining that the second fraction does not exceed a typicality threshold.

16. The system of claim 11, wherein the control circuitry is further configured to:
identifying a time slot typical for the second subset of users and atypical for the first subset of users based on content item consumption data of the first subset of users and content item consumption data of the second subset of users; and
wherein the control circuitry is configured to generate for display the recommendation for the second content item in response to determining that the user has not consumed content at the time slot typical for the second subset of users for a predetermined period of time, and
wherein the second content item is scheduled for the time slot typical for the second subset of users and atypical for the first subset of users.

17. The system of claim 11, wherein the control circuitry is further configured to:
identifying a first set of time slots typical for the first subset of users and atypical for the second subset of users based on content item consumption data of the first subset of users and content item consumption data of the second subset of users;
identify a second set of time slots typical for the second subset of users and atypical for the first subset of users based on content item consumption data of the first subset of users and content item consumption data of the second subset of users;

wherein the control circuitry is configured to generate for display the recommendation for the second content item in response to determining that the user has consumed more than a first threshold amount of content items scheduled for time slots of the first set and has consumed less than a second threshold amount of content items scheduled for time slots of the second set over a predetermined time period.

18. The system of claim 11, wherein the control circuitry is configured to generate for display a recommendation for the second content item by generating for display an incentive to consume the second content item.

19. The system of claim 11, wherein the control circuitry is configured to identify the time slot typical for the first subset of users and atypical for the second subset of users by using at least one of partial least squares regression model and Shapley additive explanation model.

20. A system for providing content recommendations to prevent user churn, the system comprising:

control circuitry configured to:

access content item consumption data for a plurality of users previously or currently subscribed to a media service, wherein the content item consumption data comprises information about time slots when content items are consumed by users and information about content item types of the content items;

determine, by querying a database, that a first subset of the plurality of users has unsubscribed from the media service during a predetermined time period and that a second subset of the plurality of users has not unsubscribed from the media service during the predetermined time period, wherein the database is queried based on the plurality of users associated with the accessed content item consumption data;

identify a time slot typical for the first subset of users and atypical for the second subset of users based on content item consumption data of the first subset of users and content item consumption data of the second subset of users;

identify a content item type typical for the first subset of users and atypical for the second subset of users based on the content item consumption data of the first subset of users and the content item consumption data of the second subset of users;

monitor content item consumption of a user to determine whether the user is consuming a first content item at the identified time slot, wherein the first content item is of a type that is the same as the identified content type;

in response to determining that the user is consuming the first content item at the identified time slot, generate for display, using display circuitry, a recommendation for a second content item, wherein the second content item is scheduled for a time slot that is different from the identified time slot, and wherein the second content item is of a type that is the different from the identified content type; and in response to determining that the user is not consuming the first content item at the identified time slot, continue to monitor content item consumption of the user.

* * * * *